United States Patent
Bade et al.

(10) Patent No.: US 8,707,383 B2
(45) Date of Patent: Apr. 22, 2014

(54) COMPUTER WORKLOAD MANAGEMENT WITH SECURITY POLICY ENFORCEMENT

(75) Inventors: Steven A. Bade, Georgetown, TX (US); Andrew Gregory Kegel, Redmond, WA (US); Ronald Perez, Mount Kisco, NY (US); Brian D. You, Mercer Island, WA (US)

(73) Assignee: International Business Machines Corporation, Armonk, NY (US)

( * ) Notice: Subject to any disclaimer, the term of this patent is extended or adjusted under 35 U.S.C. 154(b) by 1598 days.

(21) Appl. No.: 11/464,929

(22) Filed: Aug. 16, 2006

(65) Prior Publication Data

US 2008/0046960 A1    Feb. 21, 2008

(51) Int. Cl.
*H04L 29/00* (2006.01)

(52) U.S. Cl.
USPC .................................................. 726/1; 726/2

(58) Field of Classification Search
CPC .......... H04L 63/20; G06F 21/00; G06F 17/20
USPC ......................................... 709/225; 726/1, 2
See application file for complete search history.

(56) References Cited

U.S. PATENT DOCUMENTS

| | | | |
|---|---|---|---|
| 6,715,144 B2 | 3/2004 | Daynes et al. | |
| 6,941,366 B2 | 9/2005 | Antes et al. | |
| 7,577,722 B1 * | 8/2009 | Khandekar et al. | 709/220 |
| 8,156,490 B2 * | 4/2012 | Bozek et al. | 718/1 |
| 2004/0243706 A1 * | 12/2004 | Rosenbach et al. | 709/225 |
| 2005/0086372 A1 | 4/2005 | Jhingan | |
| 2005/0251802 A1 * | 11/2005 | Bozek et al. | 718/1 |
| 2005/0251854 A1 * | 11/2005 | Shay | 726/2 |
| 2006/0026671 A1 * | 2/2006 | Potter et al. | 726/7 |

OTHER PUBLICATIONS

Milojicic et al, "Process Migration", ACM Computing Surveys, vol. 32, No. 3, Sep. 2000, pp. 241-299. Mi.

* cited by examiner

*Primary Examiner* — Jeffrey Pwu
*Assistant Examiner* — Helai Salehi
(74) *Attorney, Agent, or Firm* — Yee & Associates, P.C.; Parashos T. Kalaitzis

(57) ABSTRACT

A computer implemented method, data processing system, and computer program product for managing computer workloads with security policy enforcement. When a determination is made that a component in a data processing system has failed to meet processing requirements, a candidate host to where the component may be migrated based on performance considerations is identified. A first security policy associated with the component is compared to a second security policy associated with the candidate host to determine if the first security policy is equivalent to or stronger than the second security policy. Responsive to a determination that the first security policy is equivalent to or stronger than the second security policy, the component is migrated to the candidate host.

16 Claims, 4 Drawing Sheets

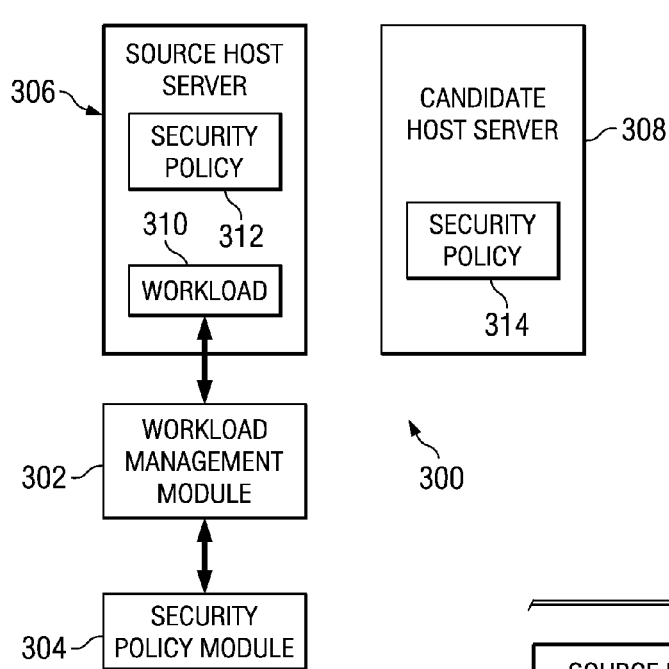
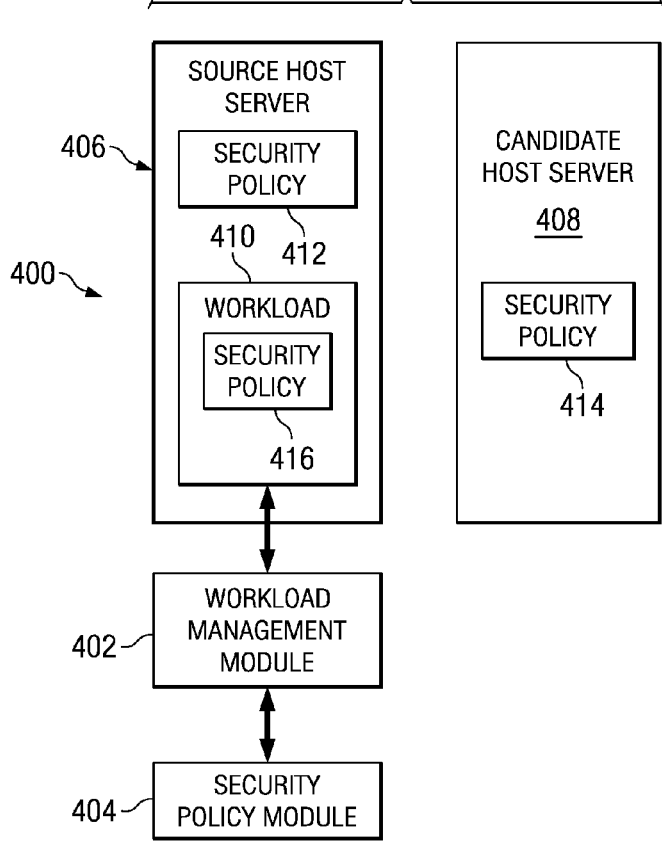

COMPUTER WORKLOAD MANAGEMENT WITH SECURITY POLICY ENFORCEMENT

BACKGROUND OF THE INVENTION

1. Field of the Invention

The present invention relates generally to an improved data processing system, and in particular, to a computer implemented method, data processing system, and computer program product for managing computer workloads with security policy enforcement.

2. Description of the Related Art

Information and service providers are often required to provide services to clients with a guaranteed, specific level of quality, e.g., response time, while at the same time keeping overhead low so that a profit can be made. To facilitate this process, management programs are typically used to monitor and control processes within a computer system to optimize the usage of components and capabilities in a constantly changing environment. This optimization includes preventing applications (workloads) from obtaining more processing power or memory than they have been allocated.

A workload manager is an operating system component that provides an ability to control how scheduling, memory management, and device driver calls allocate CPU, physical memory, and I/O bandwidth to computational processes. When a Workload Management (WLM) system examines the computing, communications, and I/O loads of a set of computers, the workload manager may move or migrate computational workloads from one server to another to balance against certain policies. For example, a workload manager, such as eWLM Workload Manager, which is a product of International Business Machines Corporation, may examine CPU loads and attempt to guarantee that a given workload has all the server resources necessary to meet a given service level agreement (SLA), such as a guaranteed maximum response time. If other server resources are needed, the workload manager may move the workload to another server to ensure that the service level agreement will be met.

While the migration process described above may work well for computer centers that have universal security policies applied across all (or most) servers, problems can occur when the workload is moved to a new host server, and the new host has a different security policy than the donating host server. As Workload Management is commonly used with large computer centers which consolidate many different servers, some servers in the computer center may have a weaker security policy than other servers. If the new host server has a weaker security policy than the donating host server, the application (workload) would be exposed to more or different security attacks, which is likely a violation of the application's security policy. Such a policy violation is unacceptable.

SUMMARY OF THE INVENTION

The illustrative embodiments provide a computer implemented method, data processing system, and computer program product for managing computer workloads with security policy enforcement. When a determination is made that a component in a data processing system has failed to meet processing requirements, a candidate host to where the component may be migrated based on performance considerations is identified. A first security policy associated with the component is compared to a second security policy associated with the candidate host to determine if the first security policy is equivalent to or stronger than the second security policy. Responsive to a determination that the first security policy is equivalent to or stronger than the second security policy, the component is migrated to the candidate host.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of an exemplary workload management system where host identifiers are provided to a security policy module for a security policy comparison prior to workload migration;

FIG. 4 is a block diagram of an exemplary workload management system where security policies are provided to a security policy module for the security policy comparison prior to workload migration;

DETAILED DESCRIPTION OF THE PREFERRED EMBODIMENT

Figure 1:
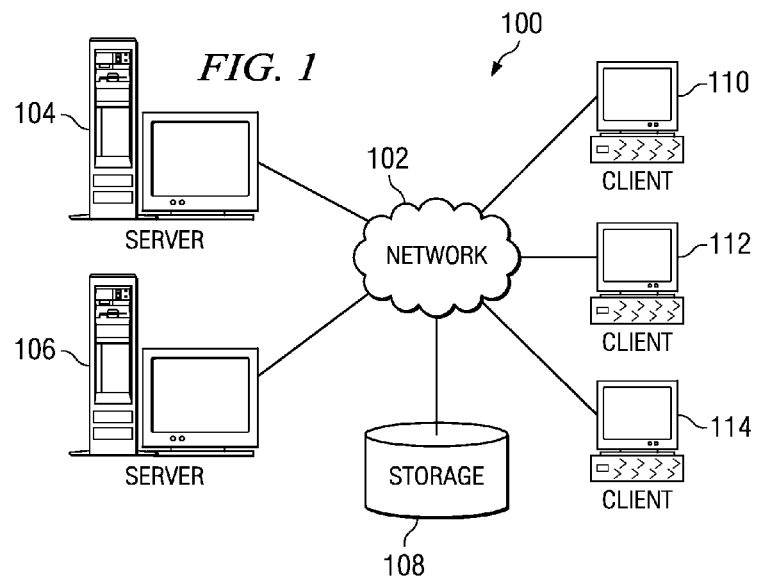
FIG. 1 depicts a pictorial representation of a distributed data processing system in which the illustrative embodiments may be implemented.
Figure 2:
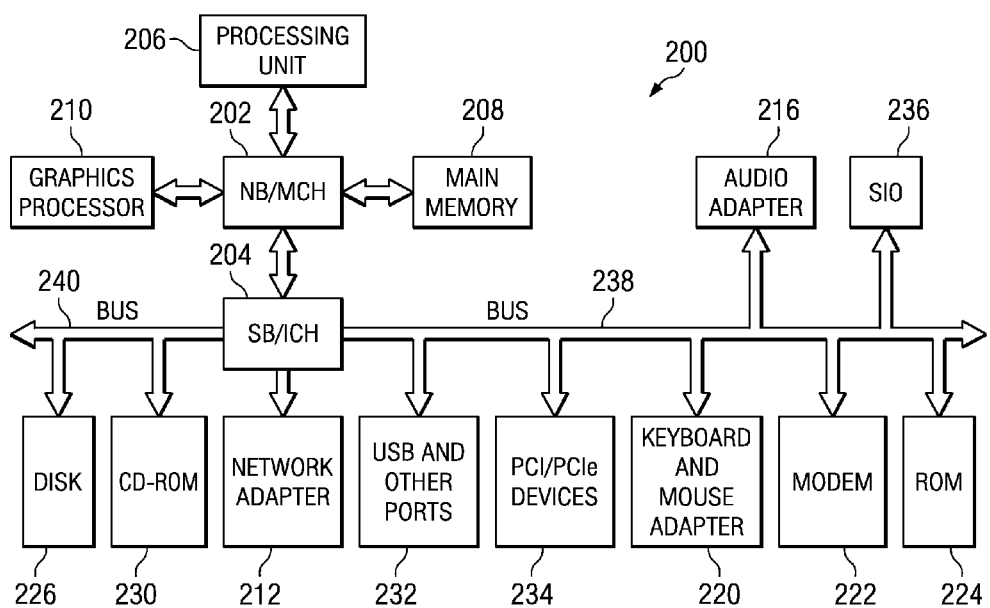
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

As previously mentioned, conventional workload managers use performance and I/O characteristics to determine where to migrate or assign a workload. Although the migration of a workload to another host server may enable certain policies within the computer system to be met, the migration of a workload to a candidate host server having a weaker security policy than the source host server exposes the workload to more or different security attacks, which may be an unacceptable violation of the workload's security policy. The illustrative embodiments address this problem by providing a management system which enables process migration from a source node to a candidate node while ensuring that the candidate node meets the security policy associated with the migrating process or machine. A security policy is a set of regulations for maintaining a certain level of security of a company's physical and information technology assets. The security policy may also be a general device, which may include system information such as hardware (virtual or physical), operating system software, virtualization (hypervisor), software configuration, networking, storage, or system isolation characteristics, etc.

In particular, the management system in the illustrative embodiments provides a workload manager which manages the assignment of a component, such as a workload, virtual machine, and/or physical machine, within the computer system. The workload manager may determine at some point in time that a component should be moved from one host server to another host server in order to adhere to certain policies, such as a service level agreement. Prior to evaluating the effects of migrating the component to another host server, the workload manager first makes a determination that the candidate host server supports the same security policy as the component. For instance, the workload manager sends a request to a security policy module to compare the security policy of the migrating component to the candidate host server. The comparison may comprise an equivalency check or a relevancy check. For example, in an equality check, the security policy module may determine that the candidate host server is an acceptable candidate host system if the security policy associated with the source host server is the same as the security policy assigned to the candidate host server. In a relevancy check, the security policy module may determine that the candidate host server is an acceptable candidate host system if the security policy associated with the candidate host server is equivalent to or stronger than the security policy assigned to the source host server. Likewise, if the security policy module determines that the security policy associated with the candidate host server is weaker than or not comparable to the security policy assigned to the source host server, the security policy module informs the workload manager that the candidate host server is not an acceptable candidate for migration. Thus, with the management system in the illustrative embodiments, a workload manager need only evaluate the effects of migrating a component to a candidate host server when the security policy module determines that the candidate host server has an equivalent (or greater) security policy.

Turning now to FIG. 3, a block diagram of an exemplary workload management system where host identifiers are provided to a security policy module for a security policy comparison prior to workload migration is shown. The exemplary workload management system may be implemented in a distributed data processing system, such as network data processing system 100 in FIG. 1.

In this illustrative example, workload management system 300 comprises workload management module 302, security policy module 304, source host server 306, and at least one candidate host server, such as candidate host server 308. Source host server 306 includes an application, such as workload 310, and is associated with a certain security policy 312. Candidate host server 308 is associated with a certain security policy 314.

Workload management module 302 may examine workload 310 with source host server 306 and determine that workload 310 has failed to meet its processing rate requirements. Based on the examination, workload management module 302 determines that workload 310 should be moved from source host server 306. In this illustrative example, candidate host server 308 is a candidate server to which workload 310 may be moved based on performance considerations.

Prior to migrating workload 310 from source host server 306 to candidate host server 308, workload management module 302 queries security policy module 304 to determine if the security policy associated with candidate host server 308 supports the security policy associated with workload 310 on source host server 306. In one embodiment, workload management module 302 queries security policy module 304 by first obtaining host identification tags for source host server 306 and candidate host server 308. Workload management module 302 presents these two identification tags to security policy module 304, and security policy module 304 exposes an interface which accepts the host identification tags. Security policy module 304 then uses the host identification tags to obtain the security policies associated with the host servers. For instance, based on the identification tags, security policy module 304 may obtain security policy 312, which is associated with source host server 306, and security policy 314, which is associated with candidate host server 308. In another embodiment, workload management module 302 may present the security policies associated with the source and candidate host servers, such as security policy 312 and security policy 314, directly to security policy module 304 for evaluation.

Once security policy module 304 obtains security policy 312 and security policy 314, security policy module 304 performs an 'equivalency' check by comparing the two security polices and determining if the security policies are equivalent or not. A security policy is 'equivalent' to another security policy when the security policy performs the same restrictions and allows the same access as the other security policy. Otherwise, the security policies are deemed 'not comparable'. One example of how security policies may be compared is to compare the rules definitions that are in place on each system item by item to ensure that both the rule and its place in the evaluation sequence are the same.

If the security policies are equivalent, security policy module 304 returns an indication to workload management module 302 that the two host servers support the same security policy. At this point, workload management module 302 may further evaluate moving workload 310 from source host server 306 to candidate host server 308. Thus, by performing the security check prior to migration, workload manager module 302 may only need to evaluate the effects of migrating workload 310 to candidate host server 308 which has an equivalent security policy.

If the security policies are not equivalent, workload manager module 302 would no longer consider candidate host server 304 as a candidate host for workload 310, and workload manager module 302 would look for other candidate hosts to accommodate workload 310.

It should be noted that the comparison may also include 'relative' levels of equivalency. For instance, the comparison may include a relevancy check which determines whether the security policy associated with the candidate host server is 'stronger than' or 'weaker than' than the security policy associated with the source host server. A security policy may be stronger than another security policy when the security policy is more restrictive, such as by denying accesses or operations which are allowed by the other security policy. A security policy may be weaker than another security policy when the security policy allows accesses or operations to be performed which are disallowed by the other security policy. Thus, the comparison performed by security policy module may identify that candidate host server 308 is an acceptable candidate host system if security policy 314 is equivalent to or stronger than security policy 312.

FIG. 4 is a block diagram of an exemplary workload management system where security policies are provided to a security policy module for the security policy comparison prior to workload migration. The exemplary workload management system may be implemented in a distributed data processing system, such as network data processing system 100 in FIG. 1.

In this illustrative example, workload management system 400 comprises workload management module 402, security policy module 404, source host server 406, and at least one candidate host server, such as candidate host server 408. Source host server 406 includes an application, such as workload 410. Source host server 406 is associated with a certain security policy 412. Candidate host server 408 is associated with a certain security policy 414. However, workload 410 is directly associated with its own security policy 416.

When workload management module 402 determines that workload 410 should be moved from source host server 406, workload management module 402 queries security policy module 404 to determine if the security policy associated with candidate host server 408 supports the security policy directly associated with workload 410 on source host server 406. In this case, the security policy directly associated with workload 410 is security policy 416. Prior to migrating workload 410 from source host server 406 to candidate host server 408, workload management module 402 may present security policy 416 (related to workload 410) and security policy 414 (related to candidate host server 408) to security policy module 404 for comparison.

If the comparison returns a value of "equivalent" or "stronger than" (i.e., candidate host server 402 has an equivalent or stronger security policy 414 than security policy 416 associated with workload 410), workload management module 402 may then evaluate the effects of migrating workload 410 to candidate host server 408 which has an equivalent or stronger security policy. If the comparison returns a value of "not comparable" or "weaker than" (i.e., candidate host server 402 has a non-equivalent or weaker security policy 414 than security policy 416 associated with workload 410), workload management module 402 would drop candidate host server 408 from further consideration as a candidate host.

Figure 5:
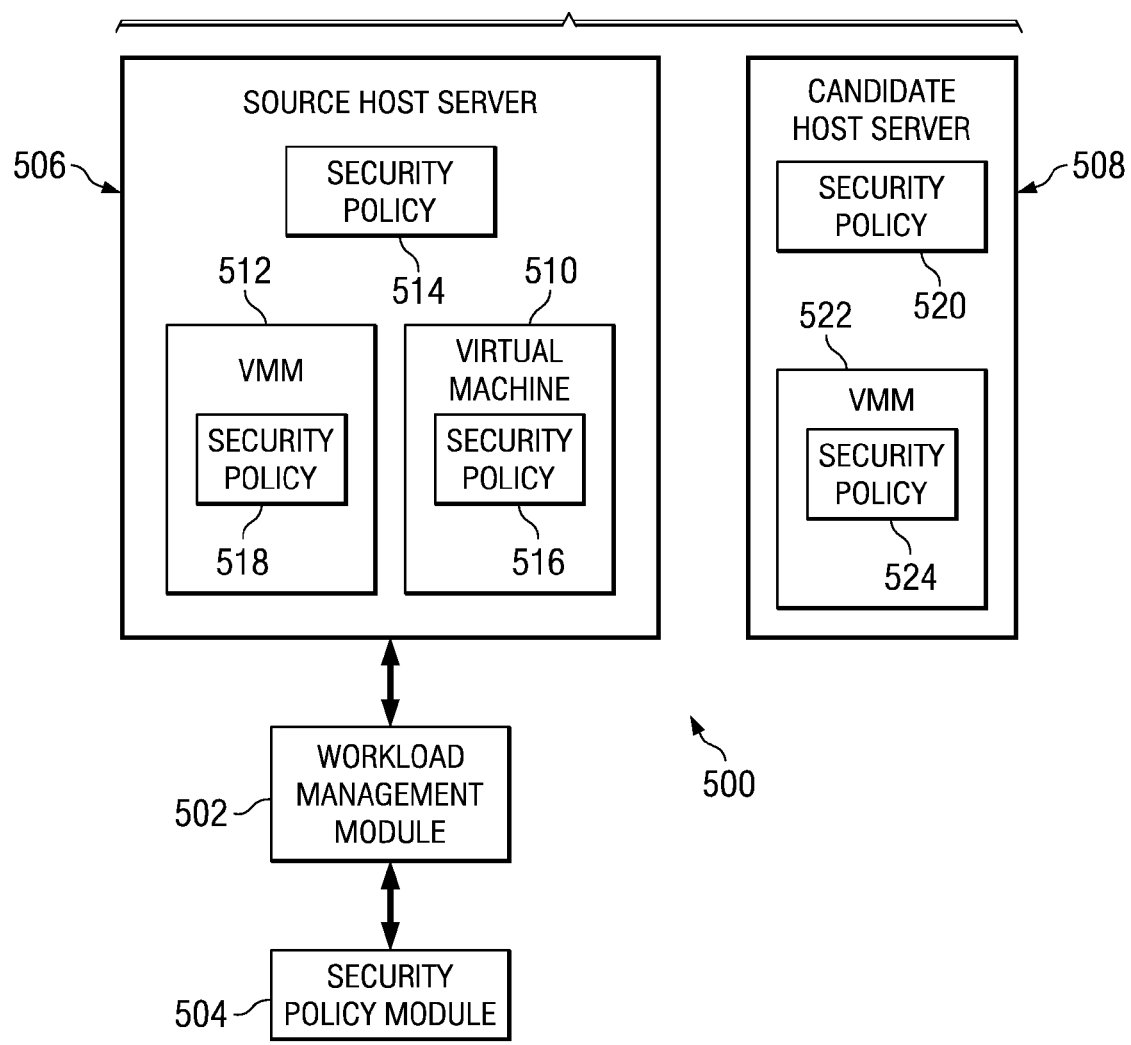
FIG. 5 is a block diagram of an exemplary workload management system where security policies are provided to a security policy module for the security policy comparison prior to virtual machine migration.

FIG. 5 is a block diagram of an exemplary workload management system where security policies are provided to a security policy module for the security policy comparison prior to virtual machine migration. In particular, FIG. 5 illustrates how the workload management system in the illustrative embodiments may be extended to consider virtual resources. The exemplary workload management system may be implemented in a distributed data processing system, such as network data processing system 100 in FIG. 1.

In this illustrative example, workload management system 500 comprises workload management module 502, security policy module 504, source host server 506, and at least one candidate host server, such as candidate host server 508. Source host server 506 includes a virtual machine, such as virtual machine 510, and a virtual machine monitor, such as VMM 512. Source host server 506 is associated with a certain security policy 514, while virtual machine 510 is directly associated with security policy 516, and VMM 512 is directly associated with security policy 518. Candidate host server 508 is associated with a certain security policy 520. VMM 522 on candidate host server 508 is directly associated with security policy 524.

Some workload is encapsulated and contained within virtual machine 510. In contrast with the examples in FIGS. 3 and 4 which move a workload from a source host server to a candidate host server, workload management module 502 in FIG. 5 may migrate an entire virtual machine 510 that contains the workload. Virtual machine 510 is hosted by a virtual machine monitor (or hypervisor), such as VMM 512. In this example, it should be assumed that any compatibility requirements that allow virtual machine 510 to be hosted by VMM 512 on source host server 506 or VMM 522 on candidate host server 508 are met.

Security policy 516 pertains to virtual machine 510. For security policy 516 to be running within source host server 506, security policy 516 must be compatible with security policy 518 of VMM 512 and security policy 514 of source host server 506. At some point, workload management module 502 decides to migrate virtual machine 510. Workload management module selects VMM 522 on candidate host server 508 as a possible migration candidate for virtual machine 510. Using security policy module 504, workload management module 502 compares security policy 516 associated with virtual machine 510 with security policy 524 associated with VMM 522, and also compares security policy 516 to security policy 520 associated with candidate host server 508. If either comparison performed by security policy module 504 returns either a result of "weaker than" or "not comparable", then workload management module 502 would drop VMM 522 and/or candidate host server 508 from consideration as a migration candidate. Security policy 516 may either be implemented to be like security policy 520 and security policy 524, or security policy 516 may have subparts that may be compared separately to security policies for virtual and physical entities.

In another embodiment, workload management module 502 may create a new instance of a workload processing unit or virtual machine, e.g., in deployment or provisioning of workloads and services. In this case, the security policy may be attached to the system image prototype instead of the actual running image (e.g., virtual machine 510 in FIG. 5) and the relevant operation may be "provision" or "deploy" instead of "move" or "migrate", but the process would be the same.

The illustrative embodiments are not dependent upon the particular migration technology used to implement the migration process. For instance, the migration operation may be performed by workload management module 502 itself, or workload management module 502 may signal some other system management component to perform the migration. In addition, while security policies are used in the illustrative embodiments to determine whether or not a workload or virtual machine may be migrated, the security policies do not affect the deletion of a workload or virtual machine. If a workload or virtual machine is deleted, the workload or virtual machine would be shut down and the resources would be reclaimed according to generally accepted security practices. In effect, the workload or virtual machine are migrating to "nowhere", and "nowhere" is always compatible for such a "migration".

It should be noted that the illustrative embodiments are not limited to migration of workloads or virtual machines. As described above in FIG. 5, the migration process disclosed in the illustrative embodiments allows for the migration of a virtual machine from a source host to a destination host (virtual-to-virtual migration ("v2v")) with compatible security requirements. The migration processes described in the illustrative embodiments may also be used to migrate a physical machine from one server to another (physical-to-physical migration ("p2p")), as well as convert a physical machine to a virtual machine ("p2v"), or convert a virtual machine to a physical machine ("v2p").

Figure 6:
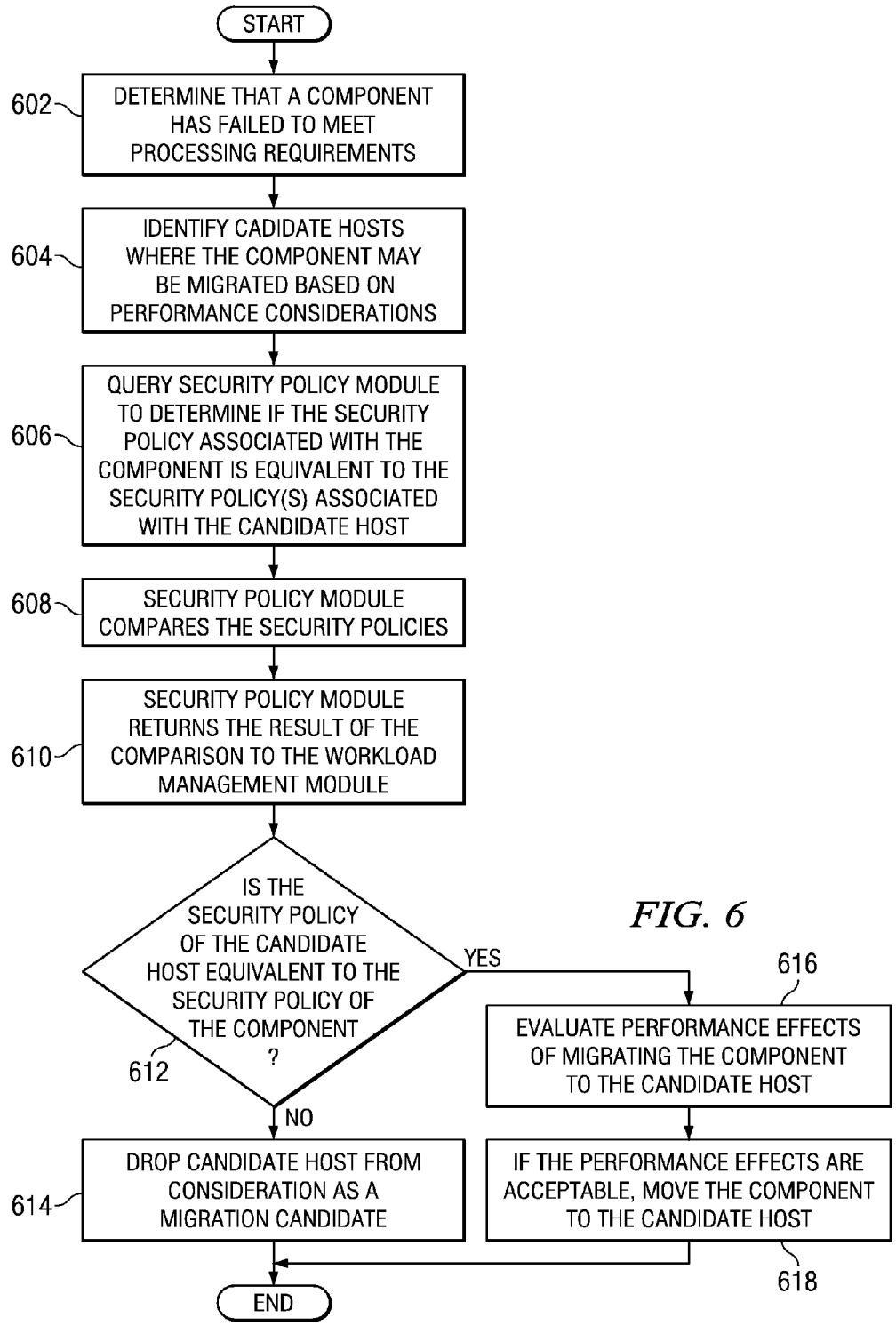
FIG. 6 is a flowchart of a process for managing computer workloads with security policy enforcement in accordance with the illustrative embodiments.

FIG. 6 is a flowchart of a process for managing computer workloads with security policy enforcement in accordance with the illustrative embodiments. The process begins with a workload management module determining that a component, such as a workload, virtual machine, and/or physical machine, within the computer system, has failed to meet processing requirements (step 602). These processing requirements are typically defined in a service level agreement. The workload management module then identifies possible candidate hosts where the component may be migrated based on performance considerations (step 604). These performance considerations may include identifying that the candidate host is able to fulfill the processing requirements in the service level agreement.

For a particular candidate host identified, the workload management module queries a security policy module to determine if the security policy associated with the migrating component is equivalent to the security policy(s) associated with the candidate host (step 606). As previously mentioned, the workload management module may provide host identifiers to the security policy module and the security policy module may then obtain the security policies, or else the workload management module may provide the security policies to the security policy module. The security policy module compares the security policies (step 608). This comparison to determine equivalency comprises a check to determine if the security policy(s) of the candidate host supports the security policy of the migrating component. The comparison may include an equivalency check and/or a relevancy check. The security policy module returns the result of the comparison to the workload management module (step 610).

Upon receiving the results, the workload management module determines if the security policy of the candidate host is equivalent to the security policy of the migrating component (i.e., the security policy of the candidate host supports the security policy of the workload or virtual machine) (step 612). If the policies are not equivalent ('no' output of step 612), the workload management module drops the particular candidate host from consideration as a migration candidate (step 614), with the process terminating thereafter.

If the policies are determined to be equivalent ('yes' output of step 612), the workload management module may evaluate the performance effects of migrating the component to the candidate host with the equivalent security policy (step 616). If the performance effects meet an acceptable threshold level of performance, the workload management module may move the component to the candidate host (step 618), with the process terminating thereafter. Although the performance evaluation of the migration effects in this example is described as taking place after the policy check has been performed, it should be noted that the performance evaluation may occur before, during, or after the policy check is performed. Regardless of when the performance evaluation takes place, no migration may occur if the policy check fails.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing computer workloads with security policy enforcement, the computer implemented method comprising:
   running a virtual machine on a host;
   responsive to determining that a virtual machine has failed to meet processing requirements defined in a service level agreement, identifying, by a processor in a computer, a candidate host where the virtual machine may be migrated based on performance considerations;
   comparing a first security policy for the virtual machine and stored in a memory of the computer to both a second security policy for the candidate host and a third security policy for a virtual machine monitor in the candidate host to determine if the first security policy is equivalent to or stronger than the second security policy and the third security policy, wherein the first security policy is equivalent to the second security policy and the third security policy if the first security policy has equivalent security restrictions and allows equivalent access restrictions as the second security policy and the third security policy, and wherein the first security policy is stronger than the second security policy and the third security policy if the first security policy has equivalent security restrictions and also additional security restrictions and additional access restrictions than restrictions contained in the second security policy and the third security policy;
   determining performance effects of migrating the virtual machine to the candidate host only if the first security policy is determined to be equivalent to or stronger than the second security policy and the third security policy;
   responsive to a determination that the first security policy is weaker than the second security policy and the third security policy, dropping the candidate host from consideration as a migration candidate, wherein the first security policy is weaker than the second security policy and the third security policy if the first security policy has fewer security restrictions than the second security policy and the third security policy; and
   responsive to a determination that the performance effects determined meet the processing requirements, migrating the virtual machine to the candidate host.

2. The computer implemented method of claim 1, wherein the migrating step further comprises:
   evaluating performance effects of migrating the virtual machine to the candidate host, wherein the virtual machine is migrated to the candidate host only if the performance effects meet an acceptable threshold level of performance.

3. The computer implemented method of claim 1, wherein the comparing step further comprises:

querying a security policy module to determine if the first security policy is equivalent to the second security policy and the third security policy.

4. The computer implemented method of claim 1, wherein the comparison comprises at least one of an equivalency check or a relevancy check.

5. The computer implemented method of claim 2, wherein the acceptable threshold level of performance includes an ability to fulfill the processing requirements in a service level agreement.

6. The computer implemented method of claim 3, further comprising:
providing a host identifier representing the virtual machine and a host identifier representing the candidate host to the security policy module, wherein the security policy module uses the host identifiers to obtain the first security policy, the second security policy, and the third security policy.

7. The computer implemented method of claim 3, further comprising:
providing the first security policy, the second security policy, and the third security policy to the security policy module.

8. The computer implemented method of claim 4, wherein an equivalency check comprises determining if the second security policy and the third security policy are equivalent to the first security policy.

9. The computer implemented method of claim 4, wherein a relevancy check comprises determining if the second security policy and the third security policy are stronger than or weaker than the first security policy.

10. A data processing system for managing computer workloads with security policy enforcement, the data processing system comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to run a virtual machine on a host, identify a candidate host where a virtual machine may be migrated based on performance considerations in response to a determination that the virtual machine has failed to meet processing requirements defined in a service level agreement, compare a first security policy for the virtual machine to both a second security policy for the candidate host and a third security policy for a virtual machine monitor in the candidate host to determine if the first security policy is equivalent to or stronger than the second security policy and the third security policy, wherein the first security policy is equivalent to the second security policy and the third security policy if the first security policy has equivalent security restrictions and allows equivalent access restrictions as the second security policy and the third security policy, and wherein the first security policy is stronger than the second security policy and the third security policy if the first security policy has equivalent security restrictions and also additional security restrictions and additional access restrictions than restrictions contained in the second security policy and the third security policy, determine performance effects of migrating the virtual machine to the candidate host only if the first security policy is determined to be equivalent to or stronger than the second security policy and the third security policy; responsive to a determination that the first security policy is weaker than the second security policy and the third security policy, dropping the candidate host from consideration as a migration candidate, wherein the first security policy is weaker than the second security policy and the third security policy if the first security policy has fewer security restrictions than the second security policy and the third security policy; and migrating the virtual machine to the candidate host in response to a determination that the performance effects determined meet the processing requirements.

11. A computer program product for managing computer workloads with security policy enforcement, the computer program product comprising:
a computer usable storage medium having computer usable program code stored thereon, the computer usable program code comprising:
computer usable program code for running a virtual machine on a host;
computer usable program code for identifying a candidate host where a virtual machine may be migrated based on performance considerations in response to a determination that the virtual machine has failed to meet processing requirements defined in a service level agreement;
computer usable program code for comparing a first security policy for the virtual machine to both a second security policy for the candidate host and a third security policy for a virtual machine monitor in the candidate host to determine if the first security policy is equivalent to or stronger than the second security policy and the third security policy, wherein the first security policy is equivalent to the second security policy and the third security policy if the first security policy has equivalent security restrictions and allows equivalent access restrictions as the second security policy and the third security policy, and wherein the first security policy is stronger than the second security policy and the third security policy if the first security policy has equivalent security restrictions and also additional security restrictions and additional access restrictions than restrictions contained in the second security policy and the third security policy;
computer usable program code for determining performance effects of migrating the virtual machine to the candidate host only if the first security policy is determined to be equivalent to or stronger than the second security policy and the third security policy;
computer usable program code for dropping the candidate host from consideration as a migration candidate in response to a determination that the first security policy is weaker than the second security policy and the third security policy, wherein the first security policy is weaker than the second security policy and the third security policy if the first security policy has fewer security restrictions than the second security policy and the third security policy; and
computer usable program code for migrating the virtual machine to the candidate host in response to a determination that the performance effects determined meet the processing requirements.

12. The computer program product of claim 11, wherein the computer usable program code for migrating the virtual machine to the candidate host further comprises:
computer usable program code for evaluating performance effects of migrating the virtual machine to the candidate host, wherein the virtual machine is migrated to the candidate host only if the performance effects meet an acceptable threshold level of performance.

13. The computer program product of claim 11, wherein the computer usable program code for comparing a first security policy for the virtual machine to a second security policy for the candidate host and a third security policy for a virtual machine monitor in the candidate host further comprises:

computer usable program code for querying a security policy module to determine if the first security policy is equivalent to the second security policy and the third security policy.

14. The computer program product of claim 11, wherein the comparison comprises at least one of an equivalency check or a relevancy check, wherein an equivalency check comprises computer usable program code for determining if the second security policy and the third security policy are equivalent to the first security policy, and wherein a relevancy check comprises computer usable program code for determining if the second security policy and the third security policy are stronger than or weaker than the first security policy.

15. The computer program product of claim 12, wherein the acceptable threshold level of performance includes an ability to fulfill the processing requirements in a service level agreement.

16. The computer program product of claim 13, further comprising:

computer usable program code for providing a host identifier representing the virtual machine and a host identifier representing the candidate host to the security policy module, wherein the security policy module uses the host identifiers to obtain the first security policy, the second security policy, and the third security policy.

* * * * *